United States Patent
Liu et al.

(10) Patent No.: US 7,828,472 B2
(45) Date of Patent: Nov. 9, 2010

(54) LIGHT GUIDING STRIP AND BACKLIGHT MODULE AND DISPLAY USING THE SAME

(75) Inventors: Ying Liu, Hung Hum (CN); Danding Huang, Tai Kok Tsui (CN); Chen-Jung Tsai, Shatin (CN)

(73) Assignee: Hong Kong Applied Science and Technology Research Institute Co. Ltd., Shatin, NT (HK)

(*) Notice: Subject to any disclaimer, the term of this patent is extended or adjusted under 35 U.S.C. 154(b) by 453 days.

(21) Appl. No.: 11/901,122

(22) Filed: Sep. 14, 2007

(65) Prior Publication Data
US 2008/0130314 A1    Jun. 5, 2008

(30) Foreign Application Priority Data
Nov. 30, 2006  (CN) .......................... 2006 1 0160820
Dec. 15, 2006  (CN) .......................... 2006 1 0168174

(51) Int. Cl.
*G02B 5/02* (2006.01)
(52) U.S. Cl. ...................... 362/558; 362/551; 362/555
(58) Field of Classification Search .......... 362/551–582
See application file for complete search history.

(56) References Cited

U.S. PATENT DOCUMENTS

| | | | | | |
|---|---|---|---|---|---|
| 4,750,798 | A | * | 6/1988 | Whitehead | 385/133 |
| 5,359,691 | A | * | 10/1994 | Tai et al. | 385/146 |
| 5,506,929 | A | * | 4/1996 | Tai et al. | 385/146 |
| 6,031,958 | A | * | 2/2000 | McGaffigan | 385/146 |
| 6,550,952 | B1 | * | 4/2003 | Hulse et al. | 362/555 |
| 6,786,626 | B2 | * | 9/2004 | Wu et al. | 362/555 |
| 6,966,664 | B2 | | 11/2005 | Wu | |
| 2005/0007758 | A1 | | 1/2005 | Lee et al. | |
| 2005/0140848 | A1 | * | 6/2005 | Yoo et al. | 349/64 |

FOREIGN PATENT DOCUMENTS

JP   2003-141904   5/2003

* cited by examiner

*Primary Examiner*—Sandra L O Shea
*Assistant Examiner*—Danielle Allen
(74) *Attorney, Agent, or Firm*—Merchant & Gould P.C.

(57) ABSTRACT

A light guiding strip and a backlight module and display using the same are provided. The light guiding strip of the present invention includes a plurality of light reflecting surfaces and a plurality of light emergent surfaces. Each of the light reflecting surfaces has a light diffusion pattern. The light guiding strip of the present invention has the advantages of light weight, wide LED pitch, low cost, thickness and so on.

16 Claims, 4 Drawing Sheets

LIGHT GUIDING STRIP AND BACKLIGHT MODULE AND DISPLAY USING THE SAME

BACKGROUND OF THE INVENTION

1. Field of the Invention

The present invention relates to a light guiding strip, and more particularly to a light guiding strip applied in a backlight module of a display (usually a computer display and a television, hereinafter referred to as the display).

2. Description of the Prior Art

Backlight modules are basic components in liquid crystal displays. Currently, many types of backlight modules are used. For example, in a conventional side-lit backlight module, LEDs are disposed on both sides of the backlight module, and a light guide is provided in the display area of the LCD display, and thus the light emitted by the LEDs at two ends of the backlight module can be uniformly irradiated out of the backlight module via the light guide. In a direct-lit backlight module, a plurality of LEDs is provided in the display area of the LCD display directly, so the light guide is not required. However, the half-power angle of the radiation of each LED is about±60 degrees. Therefore, in the direct-lit backlight module, a distance must be kept above the LEDs so as to allow the light emitted by two neighboring LEDs to be partially overlapping. The above two types of backlight modules have advantages and disadvantages, respectively. The side-lit backlight module employing the light guide is usually heavier than the direct-lit backlight module; however, the LEDs in the side-lit backlight module are arranged less densely than those in the direct-lit backlight module. Due to its long light-mixing distance, the direct-lit backlight module is relatively thick and also requires an additional circuit board. Therefore, the cost of the overall structure of the direct-lit backlight module is higher.

US Patent Publication Nos. 2005/0007758A1, 2005/0140848A1 and U.S. Pat. No. 6,966,664 provide backlight modules with increased LED pitch. Firstly, US Patent Publication No. 2005/0007758A1 provides a strip-shaped light guide with a plurality of openings, and an LED is disposed at two ends of the light guiding strip respectively. When the LEDs emit light, a plurality of openings of the light guide will radiate light to simulate a plurality of LEDs. Further, US Patent Publication No. 2005/0140848A1 provides a backlight module with a plurality of strip-shaped light guides, which is advantageous in that the brightness of the backlight module can be adjusted by individually driving the selected light guide. Moreover, U.S. Pat. No. 6,966,664 provides a light guiding strip, in which the light emitted by LEDs at two ends of the light guiding strip is concentratedly irradiated out from an arced surface of the light guiding strip, so as to form a linear and uniform light source.

In view of the above, the light guiding strip of the conventional art and the backlight module and display using the light guiding strip have the shortcomings of being thick and heavy or having a high cost, so it is necessary to provide a light, thin, and low-cost light guiding strip and a backlight module and display using the light guiding strip.

SUMMARY OF THE INVENTION

In order to solve the problems that the conventional light guiding strip and the backlight module and display using the light guiding strip are thick and heavy or have a high cost, the present invention provides a light guiding strip that possesses both side-lit and direct-lit characteristics and a backlight module and display using the same, so as to achieve the advantages of light weight, large LED pitch, and low cost.

The present invention also provides a light guiding strip with a wider light emergent angle and a backlight module and display using the same, in which a light guide is not required and the thickness of a light-mixing area of the backlight module can be reduced.

According to an embodiment of the present invention, a light guiding strip including a plurality of light reflecting surfaces and a plurality of light emergent surfaces is provided, in which each of the light reflecting surfaces has a light diffusion pattern.

According to another embodiment of the present invention, a backlight module using the light guiding strip is provided.

According to still another embodiment of the present invention, a display using the light guiding strip is provided.

Other objectives and achievements of the present invention will be apparent and the present invention will be fully understood according to the following description of the present invention and the claims with reference to the accompanying drawings.

DETAILED DESCRIPTION

Figure 1A:
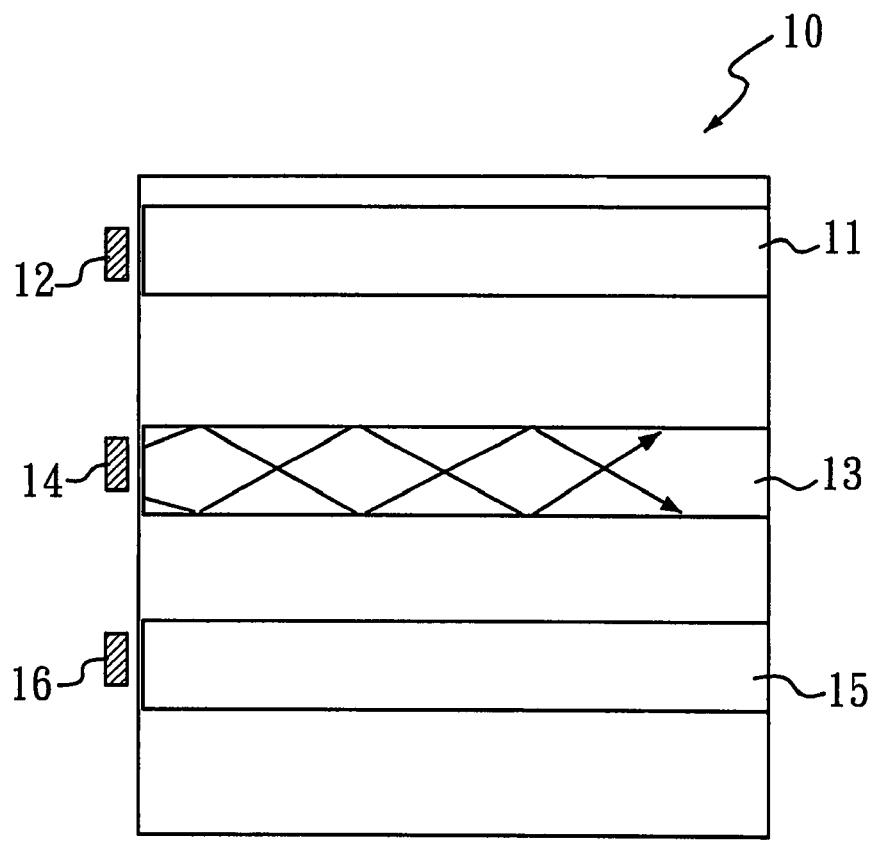
FIGS. 1A and 1B are a top view and a side view of the backlight module that possesses both the side-lit and the direct-lit characteristics of the present invention, respectively.
Figure 1B:
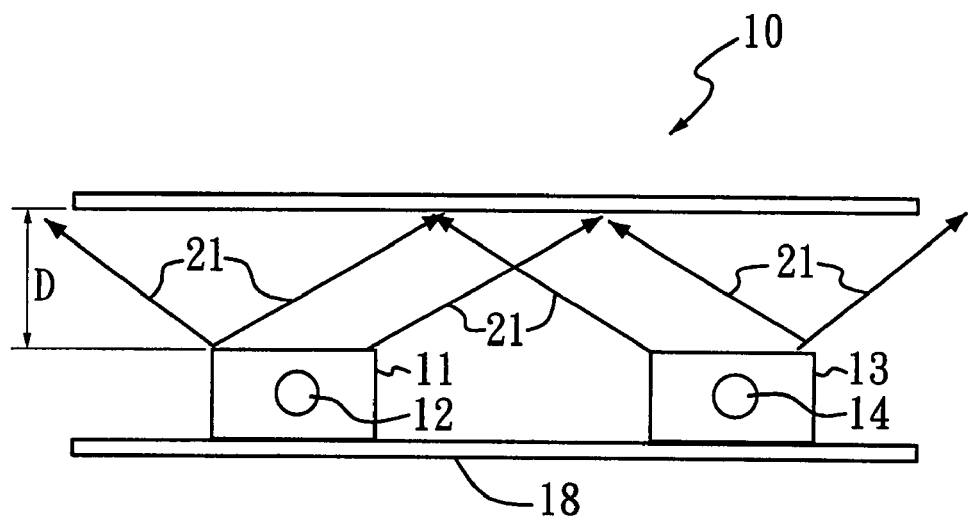

The present invention provides a light guiding strip that possesses both the side-lit and the direct-lit characteristics. The light guiding strip is applicable to a backlight module of a display. FIGS. 1A and 1B are a top view and a side view of the backlight module 10 that possesses both the side-lit and the direct-lit characteristics, respectively. As shown in FIG. 1A, the backlight module 10 includes a plurality of light guiding strips 11, 13, and 15 disposed on a substrate 18, and an LED 12, 14, and 16 is disposed on at least one end of each of the light guiding strips 11, 13, and 15 respectively. As shown in FIG. 1B, the light generated by the LEDs 12, 14, and 16 will enter the light guiding strips 11, 13, and 15, and a part of the light 21 will come out from the upper surfaces of the light guiding strips 11, 13, and 15. According to the innovative characteristics of the light guiding strip of the present invention, a uniform light output and a larger light mixing area can be achieved, so the LED pitch can be increased. Moreover, unlike the side-lit backlight module, the backlight module 10 does not employ the light guide, so the weight and cost of the backlight module can be reduced greatly.

Figure 2:
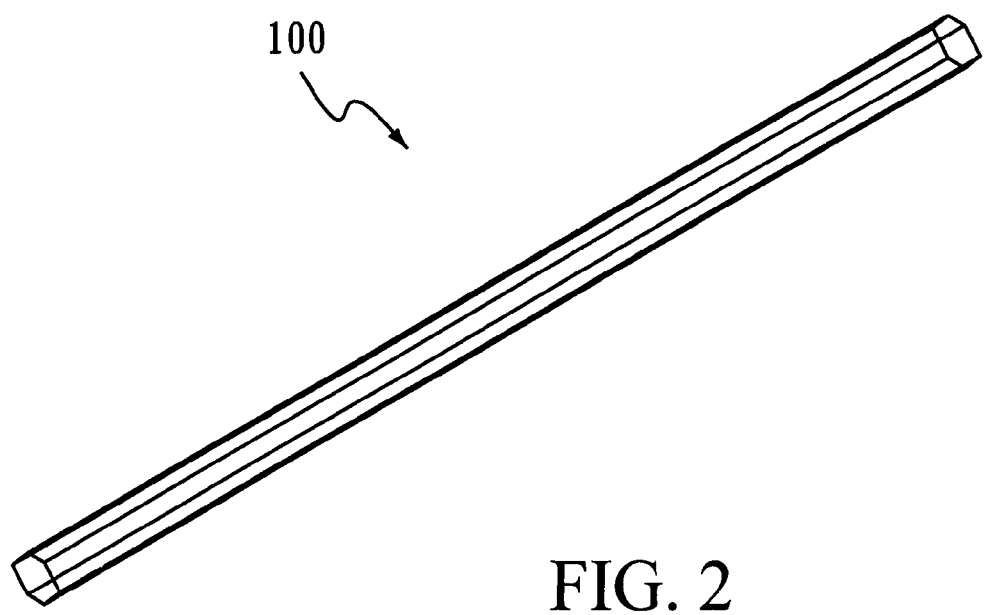
FIG. 2 is a schematic view of the light guiding strip according to a preferred embodiment of the present invention.
Figure 3:
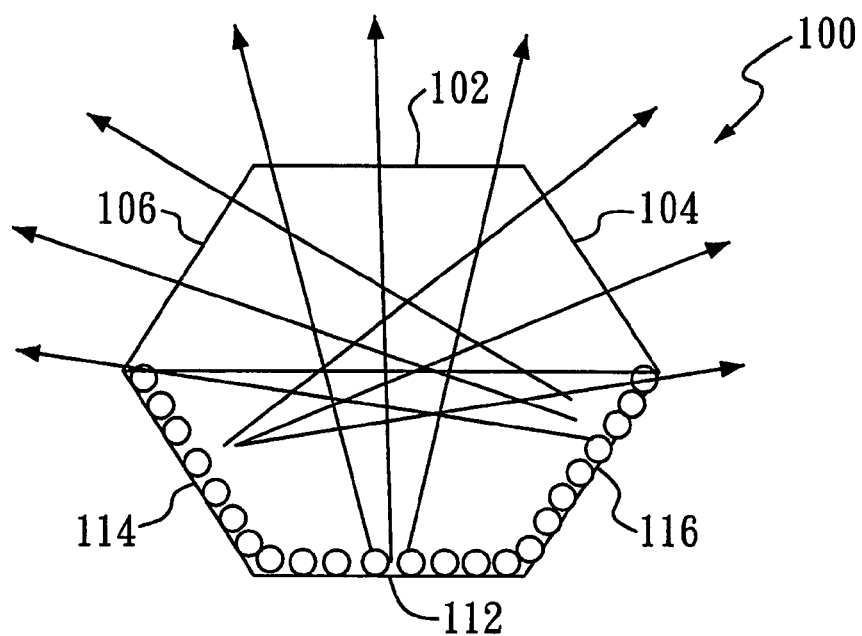
FIG. 3 is a cross sectional view of the light guiding strip of the present invention.

FIG. 2 is a schematic view of a light guiding strip 100 according to a preferred embodiment of the present invention, and FIG. 3 is a cross sectional view of the light guiding strip 100. As shown in FIG. 3, the light guiding strip 100 includes a plurality of light emergent surfaces 102, 104, and 106, and a plurality of light-reflecting surfaces 112, 114, and 116. In this embodiment, the cross section of the light guiding strip 100 is hexagonal, and each side of the hexagon corresponds to a light emergent surface or a light reflecting surface. As shown in FIG. 2, light diffusion patterns having a light diffusion function are disposed on the light-reflecting surfaces 112, 114, and 116. In this embodiment, the light diffusion patterns are a plurality of small bumps with a diameter of about 0.05-2 mm, and preferably about 0.2-0.3 mm. The light emergent surfaces 102, 104, and 106 will reflect light at specific angles and refract most of the light coming from the light diffusion patterns. As the small bumps that form the light diffusion patterns will change the total reflection conditions, the light incident on the light guiding strip 100 from the LEDs will be diffused, and the propagating direction of the light will be changed. Therefore, the small bumps allow the light to be refracted and come out from the light emergent surfaces 102, 104, and 106 easily with a certain energy distribution rule, so as to improve the light emitting efficiency and uniformity of the light guiding strip 100.

In this embodiment, the light diffusion patterns are not limited to be implemented as small bumps. For example, the light diffusion patterns can also be a plurality of small pits with a diameter of about 0.05-2 mm or V-grooves with a pitch of about 0.05-2 mm. The diameter of the small pits is preferably about 0.2-0.3 mm, and the pitch between the V-grooves is about 0.2-0.3 mm. The bumps and pits can be formed on the light guiding strip 100 by means of porous printing and/or injection molding. However, it is apparent to persons of ordinary skill in the art that other methods of forming the bumps and pits can be used, and the details will not be described herein.

Moreover, the light guiding strip 100 of this embodiment has three light emergent surfaces 102, 104, and 106, and each of the light emergent surfaces 102, 104, and 106 corresponds to a light-reflecting surface. Therefore, the light quantity irradiated from each of the light emergent surfaces 102, 104, and 106 is uniform. Moreover, it is known from FIG. 2 that the angle of the light that the light guiding strip 100 can irradiate is far greater than the half-power angle of the conventional LEDs (about±60 degrees) or the angle of the light that the conventional light guiding strip can irradiate. Thus, the backlight module using the light guiding strip 100 of this embodiment has a thinner light-mixing area compared with the conventional direct-lit illumination, so the thickness of the backlight module and the display is reduced effectively. In addition, according to another embodiment of the present invention, the light emergent surfaces 102, 104, and 106 can be smooth surfaces, roughened surfaces, or surfaces with specific micro structures. However, such surface treatment methods are known to persons of ordinary skill in the art, and thus will not be described herein again.

Figure 4:
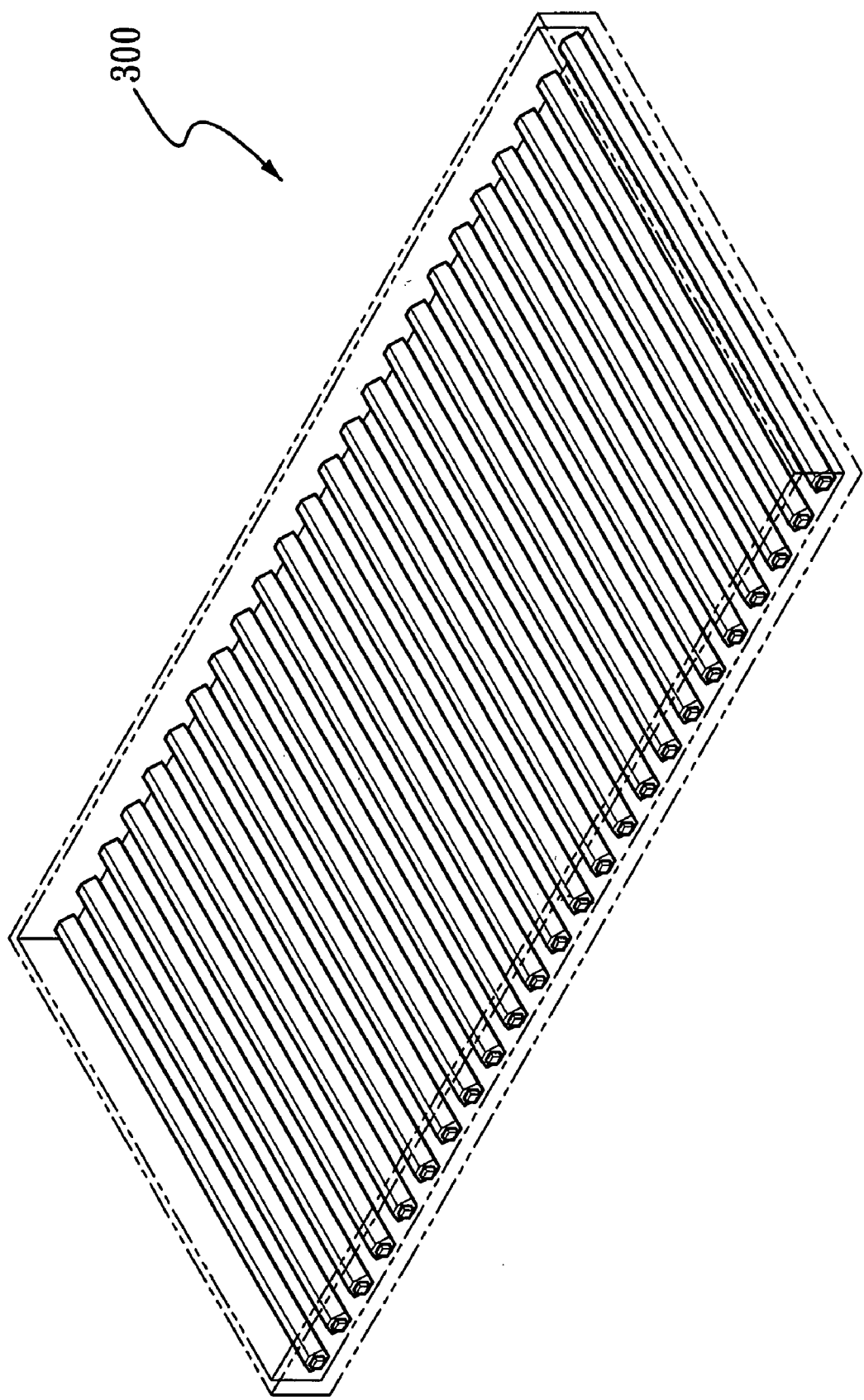
FIG. 4 is a schematic view of the backlight module having the light guiding strip of FIG. 2 according to an embodiment of the present invention.

FIG. 4 is a schematic view of a backlight module 200 using the light guiding strip of FIG. 2 according to an embodiment of the present invention. As shown in FIG. 4, a plurality of light guiding strips is arranged on a substrate in juxtaposition or in parallel. When the LEDs at any end (or both ends) of each of the light guiding strips emit light, each of the light guiding strips will also emit light, and a light-mixing area formed by mixing the light irradiated from the light guiding strips will provide a uniform area light source. Though the above embodiment mainly describes the light guiding strips and the backlight module, the display using the light guiding strips and the backlight module also falls into the scope of the claims of the present invention.

Figure 5:
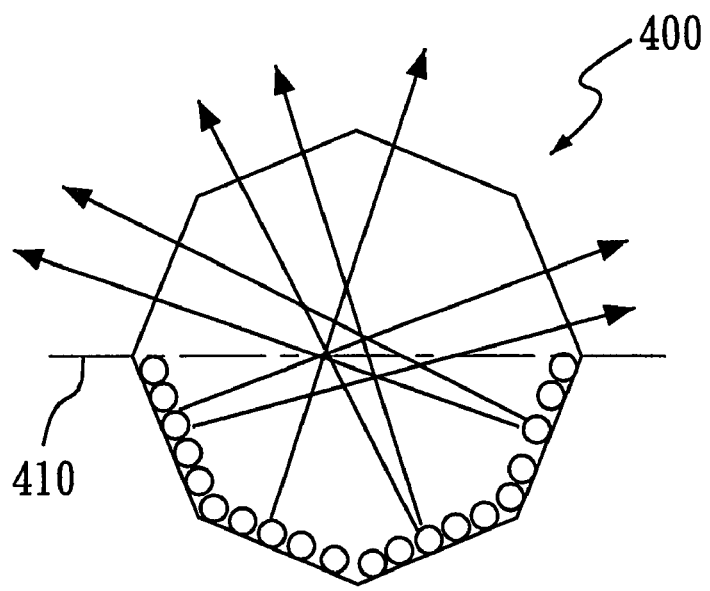
FIG. 5 is a cross sectional view of the light guiding strip according to another preferred embodiment of the present invention.

FIG. 5 is a cross sectional view of a light guiding strip 400 according to another preferred embodiment of the present invention. Referring to FIG. 5, the cross section of the light guiding strip 400 is octagonal, and each side of the octagon corresponds to a light emergent surface or a light-reflecting surface having a light diffusion pattern. Moreover, a line 410 passing through the center of the octagon divides the eight sides into an upper part and a lower part, in which the upper part and the lower part have four sides, respectively. The sides of the upper part completely correspond to the light emergent surfaces, and the sides of the lower part completely correspond to the light-reflecting surfaces. In other words, the plurality of light emergent surfaces is arranged in a cluster, and the plurality of light reflecting surfaces is also arranged in a cluster. Thus, though the light guiding strip with a hexagonal or octagonal cross section is illustrated in the above embodiments, persons of ordinary skill in the art can easily derive the fact that the cross section of the light guiding strip of other preferred embodiments of the present invention can be a polygon with four or more sides, or a polygon with four or more even-numbered sides, for example, decagonal. Furthermore, if the cross section of the light guiding strip has N sides, then the light guiding strip has N/2 light emergent surfaces arranged in a cluster and N/2 light reflecting surfaces arranged in a cluster.

Figure 6:
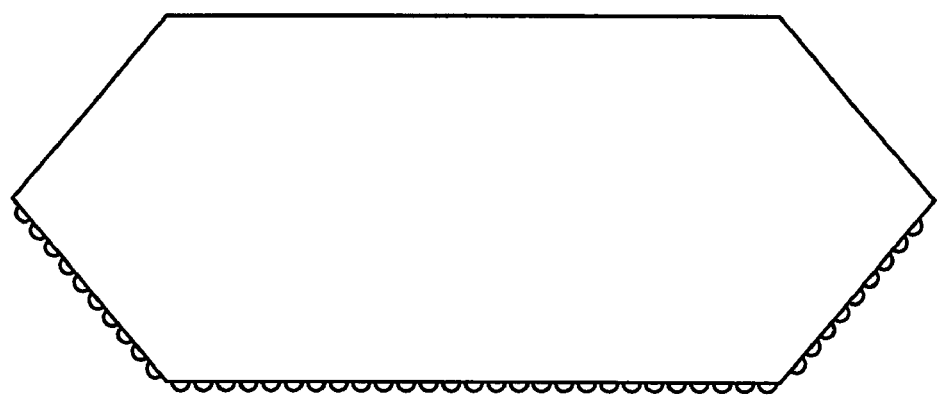
FIG. 6 is a cross sectional view of the light guiding strip according to another embodiment of the present invention.

It should be noted that according to other embodiments of the present invention, the cross section of the light guiding strip is not limited to a regular polygon. For example, the cross section of the light guiding strip according to an embodiment of the present invention can also be the one shown in FIG. 6. Moreover, the cross section of the light guiding strip can also be a polygon with an odd number of sides, for example, a heptagon, with four light emergent surfaces arranged in a cluster and three light-reflecting surfaces arranged in a cluster, or with three light emergent surfaces arranged in a cluster and four light-reflecting surfaces arranged in a cluster. The light guiding strip must have at least two light-reflecting surfaces and at least two corresponding light emergent surfaces, so as to expand the angle that the light guiding strip can irradiate the light. To sum up, the backlight module or display using the light guiding strip provided by the present invention at least has the following advantages. Firstly, as compared with the side-lit, the backlight module or display using the light guiding strip of the present invention does not need the light guide, so the weight of the backlight module is reduced. Then, the backlight module or display using the light guiding strip of the present invention can effectively increase the LED pitch, thus saving costs. Further, compared to the direct-lit type, the backlight module and display using the light guiding strip of the present invention can reduce the thickness of the backlight module. Moreover, the backlight module and display using the light guiding strip of the present invention do not need the light guide and additional circuit boards, so the cost of the overall structure is reduced greatly.

Though the technical content and features of the present invention are described above, persons skilled in the art can make variations and modifications without departing from the teaching and disclosure of the present invention. Therefore, the scope of the present invention is not limited to the disclosed embodiments, but shall cover variations and modifications without departing from the present invention, and shall be the scope covered by the claims.

We claim:

1. A light guiding strip, comprising:
   at least one light input surface,
   a plurality of light reflecting surfaces, wherein each of the light reflecting surfaces has a light diffusion pattern; and
   a plurality of light emergent surfaces,
   wherein the light guiding strip is elongated in a longitudinal direction transverse to the light input surface and has a cross section transverse to the longitudinal direction, wherein the cross section of the light guiding strip is a polygon with N sides, where N is an even number of six or greater, and the number of the light-reflecting surfaces and the number of the light emergent surfaces are both N/2.

2. The light guiding strip as claimed in claim 1, wherein the light emergent surfaces of the light guiding strip are smooth surfaces, roughened surfaces, or surfaces with specific micro structures.

3. The light guiding strip as claimed in claim 1, wherein the light-reflecting surfaces are arranged in a cluster, and the light emergent surfaces are also arranged in a cluster.

4. The light guiding strip as claimed in claim 1, wherein the light diffusion patterns are a plurality of small bumps formed on the light reflecting surfaces by means of porous printing.

5. The light guiding strip as claimed in claim 1, wherein the light diffusion patterns are a plurality of small bumps or small pits formed on the light-reflecting surfaces by means of injection molding.

6. The light guiding strip as claimed in claim 1, wherein the light diffusion patterns are a plurality of V-grooves.

7. The light guiding strip as claimed in claim 4, wherein a diameter of the small bumps is about 0.05-2 mm.

8. The light guiding strip as claimed in claim 5, wherein a diameter of the small pits is about 0.05-2 mm.

9. The light guiding strip as claimed in claim 6, wherein a pitch between the V-grooves is about 0.05-2 mm.

10. The light guiding strip as claimed in claim 1, wherein the light diffusion patterns cause the light to be diffused and outputted from the light emergent surfaces.

11. The light guiding strip as claimed in claim 1, wherein the light emergent surfaces reflect the light at specific angles and refract a part of the light coming from the light diffusion patterns.

12. A backlight module, comprising:
    a plurality of light guiding strips arranged in juxtaposition; and
    a plurality of light sources, each disposed at one end of a respective one of the plurality of light guiding strips, for providing the light into the light guiding strips,
    each of the plurality of light guiding strips comprising:
       at least one light input surface adapted to receive light from a respective one of the plurality of light sources,
       a plurality of light reflecting surfaces, wherein each of the light reflecting surfaces has a light diffusion pattern; and
       a plurality of light emergent surfaces,
       wherein the light guiding strip is elongated in a longitudinal direction transverse to the light input surface and has a cross section transverse to the longitudinal direction, wherein the cross section of the light guiding strip is a polygon with N sides, where N is an even number of six or greater, and the number of the light-reflecting surfaces and the number of the light emergent surfaces are both N/2.

13. The backlight module as claimed in claim 12, wherein the light guiding strips are disposed on a substrate.

14. A display, comprising the backlight module as claimed in claim 12.

15. The light guide strip of claim 1, wherein the cross section of the light guiding strip is a polygon with six or more at least two sides of unequal lengths.

16. The backlight module of claim 12, wherein each of the light sources comprises a light-emitting diode.

* * * * *